United States Patent [19]

Schroeder

[11] Patent Number: 4,727,918

[45] Date of Patent: Mar. 1, 1988

[54] BLIND ADJUSTER

[75] Inventor: Frederick S. Schroeder, New South Wales, Australia

[73] Assignee: Vermont Management Pty Ltd., New South Wales, Australia

[21] PCT Appl. No.: 916,495

[22] Filed: Jan. 2, 1986

[86] PCT No.: PCT/AU86/00002

§ 371 Date: Sep. 16, 1986

§ 102(e) Date: Sep. 16, 1986

[87] PCT Pub. No.: WO 86/04382

PCT Pub. Date: Jul. 31, 1986

[30] Foreign Application Priority Data

Jan. 16, 1985 [AU] Australia ............................. PG8897

[51] Int. Cl.[4] ............................................. E06B 9/322
[52] U.S. Cl. ..................................... 160/5; 160/168 R
[58] Field of Search ................. 160/DIG. 17, 1, 2, 5, 160/8, 9, 274–276 R, 168 R, 176 R

[56] References Cited

U.S. PATENT DOCUMENTS

| 3,646,985 | 3/1972 | Klann | 160/5 X |
| 3,675,023 | 7/1972 | Kunke et al. | 160/5 X |
| 4,096,903 | 6/1978 | Ringle | 160/176 R |
| 4,492,908 | 1/1985 | Stöckle et al. | 160/DIG. 17 |
| 4,644,990 | 2/1987 | Webb et al. | 160/5 |
| 4,664,169 | 5/1987 | Osaka et al. | 160/2 X |

Primary Examiner—Ramon S. Britts
Assistant Examiner—David M. Purol
Attorney, Agent, or Firm—Edwin E. Greigg

[57] ABSTRACT

Automatic control device for the slats of a venetian blind which responds to ambient radiation and which includes at least one reversible electric motor connected to rotate the slats between open and closed conditions, a sensing device indicating the level of ambient radiation of light and/or heat, two switches connected to the motor to determine its direction of rotation, an electrical control circuit responding to the sensing device to operate either one of the two switches, and limit switches to halt the motor in predetermined condition of the slats.

6 Claims, 6 Drawing Figures

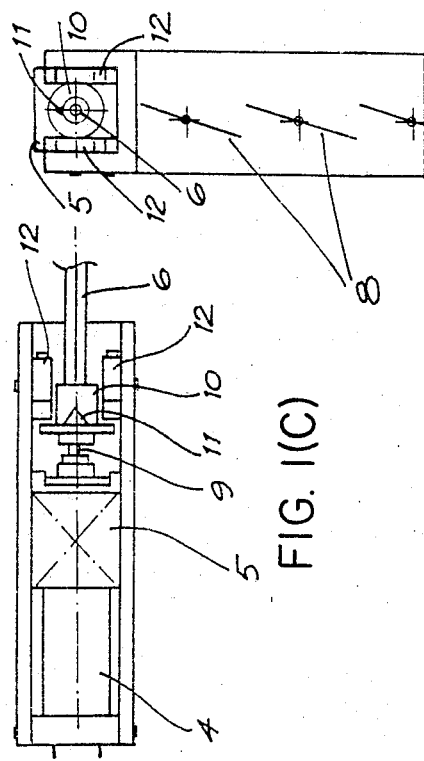
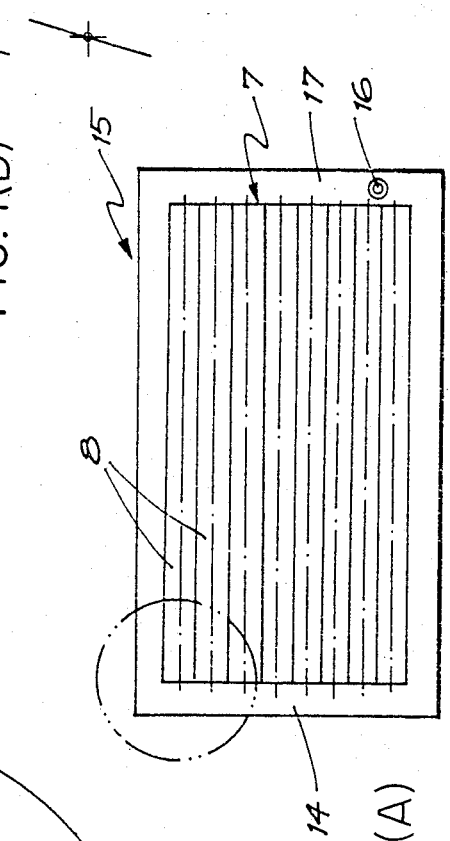
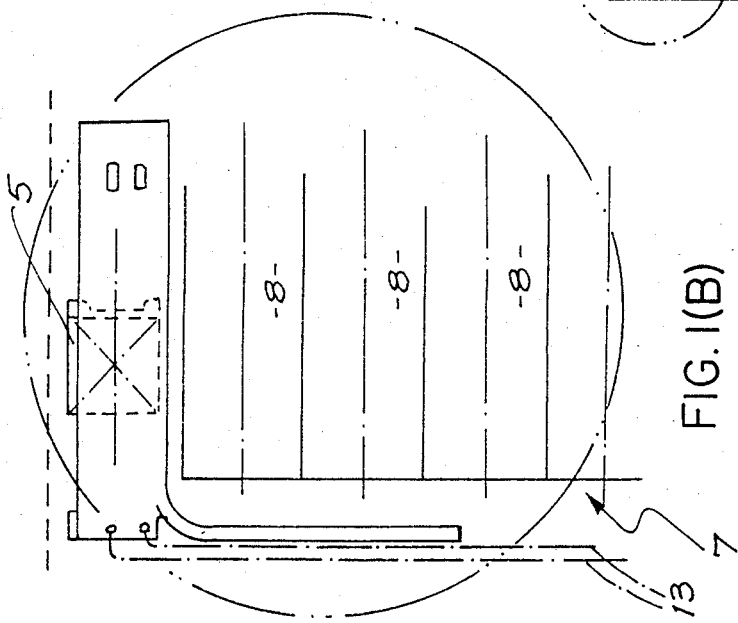
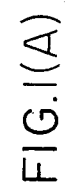

(## BLIND ADJUSTER

TECHNICAL FIELD

This invention relates to slatted blinds of the kind commonly called Venetian, and Vertical, Blinds which comprise horizontally, or vertically, disposed slates connected by cords for rotational adjustment on their axes between an overlapping (closed) condition and an open condition for the admission of light. More particularly, the invention relates to automatic means for effecting such adjustment.

BACKGROUND ART

It is common practice in commercial buildings to install Venetian blinds at each window with facility for manual adjustment at the option of the occupant. A recent analysis of the effects of solar load upon the efficiency of a building's airconditioning plant has shown that energy consumption of the plant is greatly affected by the building's solar load.

DISCLOSURE OF THE INVENTION

The present invention derives from the realization that an ideal situation for energy conservation would exist if the following criteria were met:

Winter Mode=
  Last light=blinds close to keep in valuable heat.
  First light=blinds open to allow in radiated heat.
Summer Mode=
  Last light=blinds open to allow building to cool down.
  First light=blinds close to keep building cool and avoid radiated heat.

Preferentially blind operation to be alterable by an occupant to allow for a desired changed condition of the blind which will return to the controlled mode of operation at the next change of light.

It is the principal object of the invention to provide for automatic control of blind adjustment in a building to reduce the solar load upon airconditioning of the interior thereof. By "solar load" is meant the temperature variation within the building which is related to the presence or absence of the sun's rays whether direct, diffused or reflected.

To this end the invention in one general form provides a control device for at least one slatted blind adjustable between open and closed conditions by rotation of its slats about their axes, said device comprising a reversible electric motor whose driving shaft is connectable to rotate said slats, a sensing device for signalling an indication of high or low ambient radiation, an electrical control circuit responding to an output from the sensing device to energize said motor through a selected one of two switches for rotation in one direction or the other depending upon the indications signalled, and limit switches for de-energizing said motor when said slats attain predetermined degrees of open and closed conditions.

BRIEF DESCRIPTION OF DRAWINGS

The invention will be described in greater detail with reference to the accompanying drawings, in which:

FIG. 1A shows a front elevation of a venetian blind:
FIG. 1B is a fragmentary view of one corner of the blind;
FIG. 1C shows the drive motor arrangement;
FIG. 1D is an end elevation of the motor arrangement.

MODES FOR CARRYING OUT THE INVENTION

Figure 2:
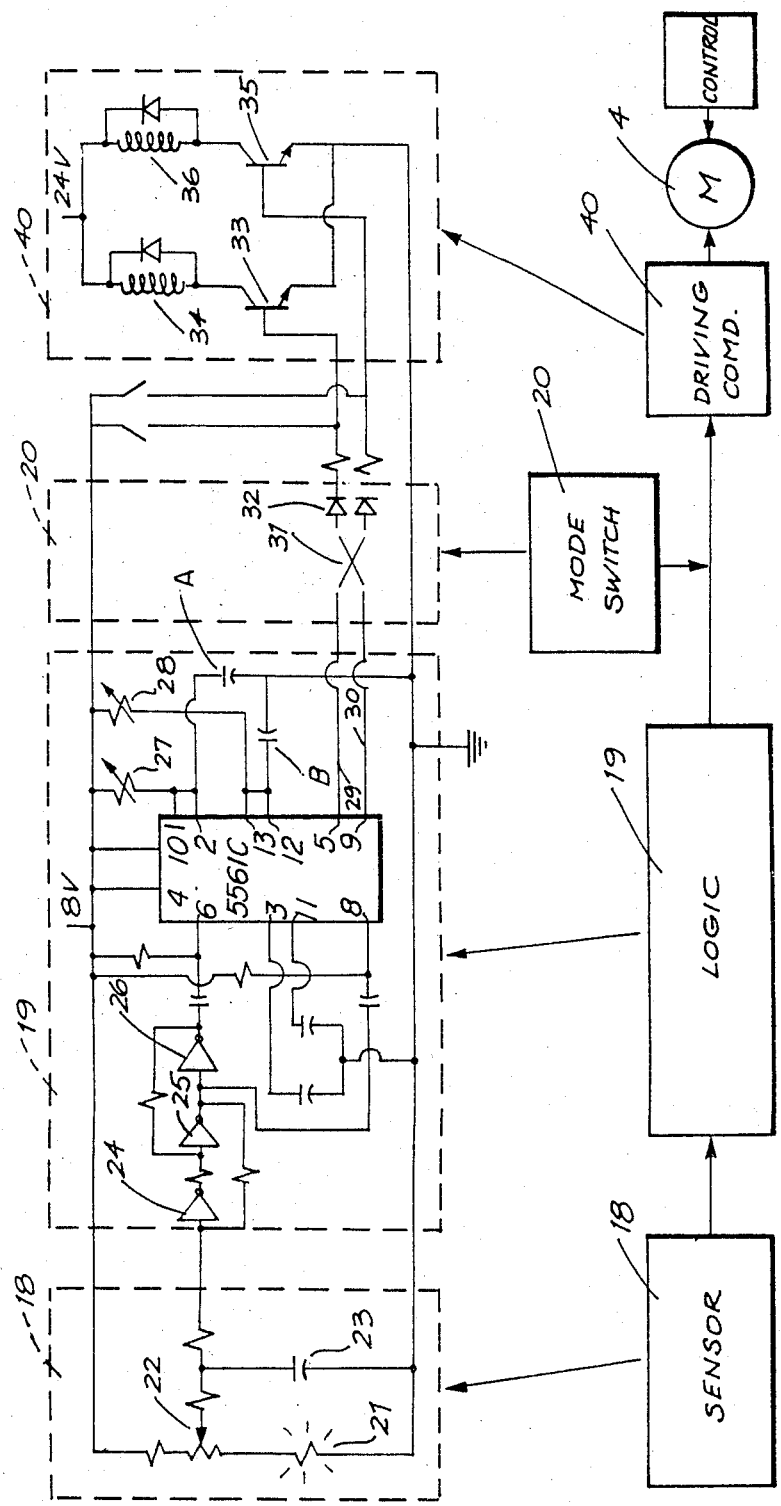
FIG. 2 shows in both schematic and block diagrammatic form a control device constructed according to this invention.

FIG. 1 shows in four separate views, A–D, a typical connection of a driving motor 4 through a gear train 5 to the rotational control rod 6 of a Venetian blind 7 having horizontally disposed slats 8 adjustable between opened and closed conditions by rotation about their axes. Through rotation of the control rod 6, supporting cords (not shown) for the slats 8 effects their rotation. The output shaft 9 from the gear train 5 is connected to a driving head 10 provided with a socket for the control rod 6 and carries a cam 11 engageable with microswitches 12 which serve as limit switches to stop the motor 4 when the slats 8 are in a predetermined degree of closed or opened condition. Power to the motor 4 is conveyed by power lead 13 housed within a mullion 14 of a window frame 15 on which the blind has been installed. A manual control 16 is preferably provided on the opposite mullion 17 to enable the occupant of a room to make manual adjustment to the blind 7. It will be appreciated that the control device, including the driving motor 4, may be incorporated with initial installation of a blind 7, or it may be subsequently installed upon an existing blind. Furthermore, the motor 4 and associated components may be mounted at the front of the blind 7.

The entire control device of this invention is depicted both by block diagram and schematic circuit in FIG. 2. A light sensor 18, which may be ultraviolet, heat sensitive, or any number of various types of sensory device, will be located in a position upon the building preferably shielded from direct sunlight but exposed to ambient light or heat conditions. It comprises an ambient radiation dependant resistor 21 providing a voltage level dependent upon the detected radiation conditions. Adjustment of this voltage level is obtained through potentiometer 22 for sensitivity control. The output of potentiometer 22 is delayed by capacitor 23 and applied as a high or low level voltage input to the logic circuit 19. Inverters 24, 25 and 26 serve to ensure that the requirements of the 556 IC for reference voltages are met. The 556 IC is a dual timer readily available on the market. Pin 6 is the triggering input of one of the timers while pin 5 is its corresponding output. Pin 8 is the triggering input of the second timer while pin 9 is its corresponding output. To trigger these timers a low voltage level (i.e., 2.3 volts or less) condition has to appear on pins 6 and 8, respectively. When the output from the sensor 18 is low, inverter 24 produces a high output into inverter 25 which then produces a low output into pin 8 of the 556 IC resulting in the triggering on of the second timer described above. When the output from sensor 18 is high (i.e., above 2.3 volts), inverter 24 produces a low output connected to inverter 25 which produces a high output connected to inverter 26 whose output then provides a low to pin 6 of the 556 IC resulting in the triggering of the first timer described above. Potentiometer 27 is coupled with capacitor A to fix the running time for one of the timers while potentiometer 28 is coupled with the capacitor B to fix the running time for the other timer. Depending upon which timer is triggered on an output signal will be produced on either of lines 29 or 30 at the output of the 556 IC. The mode switch 20 includes a double pole switch 31 to reverse the two outputs 29 and 30 via respective diodes 32 which merely ensure continuity in one direction. The mode switch 20 is intended for reversal of operation for winter or summer mode, as referred to hereinbefore.

A driving command unit 40 comprises two identical circuits receiving signals, respectively, from the output lines 29 and 30. Each of the two circuits comprise a transistor 33, or 35, driving a relay winding 34, or 36, each of which is bridged by a diode for single direction operation. Thus depending upon which output line 29 or 30 is energized relay contacts R1 (FIG. 3) associated with winding 34 or contacts R2 of winding 36 will be closed.

Figure 3:
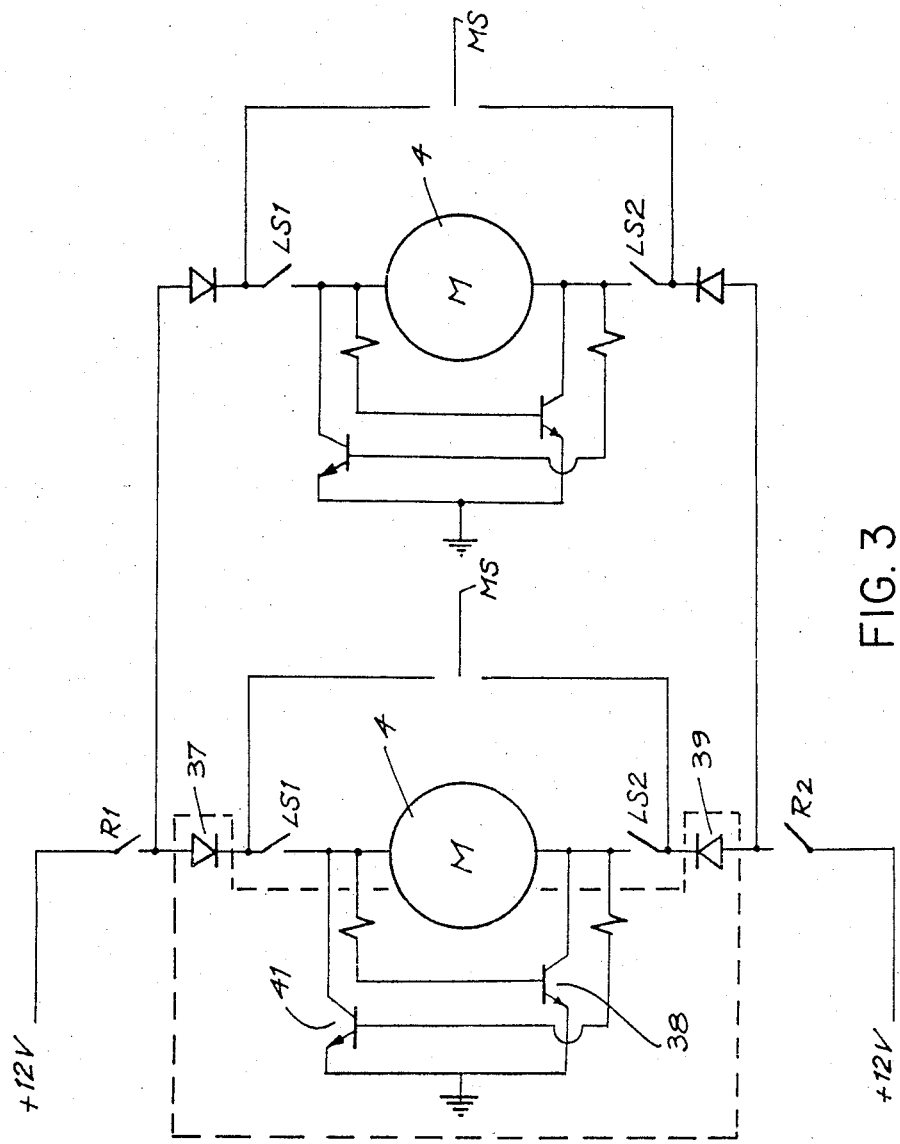
FIG. 3 shows schematically the connection of plural driving motors to the control device.

Connection of energizing power to one or more motors 4 is provided by the circuit of FIG. 3. As an example as many as ten motors 4 may be energized from any one driving command unit 40. All the motors 4 may be arranged in banks assigned to different areas of the building while separate light sensors 18 and associated logic circuits 19 will be assigned to different sides, or parts of the sides, of the building.

With reference to FIG. 3, therefore, a bank of motors 4 is serviced by the contacts R1 and R2 of a first pair of relays. It will be appreciated, of course, that closure of either contacts R1 or R2 will be the result of the sensing of a changed light condition requiring either opening or closing of the blinds. In each motor circuit a diode 37 is provided for one-way passage of electrical current through a limit switch contact LS1 to the base of a transistor 38 which connects to earth the motor 4 for passage of current in one direction therethrough. On the other hand with closure of contact R2 positive current flows through the one-way diode 39 and closed contacts LS2 to the base of transistor 41 to earth the motor 4 to permit current to flow through the motor 4 in a reverse direction. It will be noted that operation of any motor 4 will depend upon the closure of one or the other limit switch contacts LS1 or LS2. Hence, the blinds are intended to be either fully opened or closed. If an intermediate setting of the blinds is desired it would be possible to introduce further limit switches in the circuit to control motor operation. A manual switch MS is provided which is supplied with positive voltage on its wiper so as to effect operation of any motor 4 under manual control. It will be also appreciated that the relays utilized may switch AC for double winding AC motors in which case no control circuit is used for any motor 4. However, where DC voltage is utilized the relays serve to switch positive voltage into the control circuit for a single winding motor 4.

It is envisaged that under most circumstances a time delay in response to light condition changes will be necessary to ensure that the logic circuit 19 does not respond to a transitory light change such as might be occasioned by the passage of occasional clouds passing a shadow over the sensor 18. This delay can be determined by the capacity of capacitor 23.

Whereas a preferred embodiment has been described in the foregoing passages it should be understood that other forms, modifications and refinements are feasible within the scope of this invention.

I claim:

1. A system for automatic control of ambient heat penetration into a room through a window or door opening thereof, said system comprising a slatted blind within said opening having rotatable adjustment means to open and close the slats of said blind, a reversible electric motor having a driving shaft connected to said adjustment means to effect opening and closing of said slats, a heat sensing device external to said room and producing high and low output signal levels indicative of whether ambient temperature detected thereby is respectively above or below a predetermined level, two energizing circuits connected in opposite sense to said motor for driving the motor in respective ones of its two directions of rotation, a switching circuit including a timer responding to said signal levels and providing energizing power for a predetermined time period to a respective one of said energizing circuits depending upon whether the signal level is high or low, a manual override circuit connected to said energizing circuits in parallel with said switching circuit for manual control of said blind and limit switches in series with respective ones of said energizing circuits and operating in response to said slats attaining predetermined opened and closed conditions to disconnect said energizing power from said motor.

2. A system according to claim 1, wherein said switching circuit is a dual timer integrated circuit.

3. A system according to claim 1, further comprising a mode switch connected between said switching circuit and said energizing circuits operable to reverse the connection of said energizing power to said energizing circuits for switching of said system between winter and summer modes.

4. A system according to claim 1, wherein said limit switches are operated in fully opened and fully closed conditions of said slats, and there are further ones of said limit switches operating at intermediate conditions of said slats between fully opened and fully closed conditions thereof.

5. A system according to claim 1, further comprising a device connected between said sensing device and said switching circuit imposing a time delay in the response of said switching circuit to said output signal levels, thereby to avoid response of said system to transitory changes in ambient temperature.

6. A system for automatic control of ambient heat penetration into at least one room of a building through a plurality of window or door openings thereof, said system comprising a slatted blind within each of said openings having rotatable adjustment means to open and close the slats of said blind, a reversible electric motor for each of said blinds having a driving shaft connected to said adjustment means to effect opening and closing of said slats of said blind, a heat sensing device external to said building and producing high and low output signal levels indicative of whether ambient temperature detected thereby is respectively above or below a predetermined level, two energizing circuits connected in opposite sense to each of said motors for driving said motor in respective ones of its two directions of rotation, a switching circuit including a timer responding to said signal levels and providing energizing power for a predetermined time period to a respective one of said energizing circuits for each of said motors depending upon whether the signal level is high or low, a manual override circuit connected to said energizing circuits in parallel with said switching circuit for manual control of said blind, and limit switches in series with respective ones of said energizing circuits for each of said motors and operated in response to said slats of the respective one of said blinds attaining predetermined opened and closed conditions to disconnect said energizing power from said motor.

\* \* \* \* \*